United States Patent [19]

Braun

[11] Patent Number: 4,831,894
[45] Date of Patent: May 23, 1989

[54] TRANSMISSION INPUT SECTION

[75] Inventor: Eugene R. Braun, Royal Oak, Mich.

[73] Assignee: Eaton Corporation, Cleveland, Ohio

[21] Appl. No.: 168,030

[22] Filed: Mar. 14, 1988

[51] Int. Cl.$^4$ .................. F16H 3/02; F16H 37/06; F16D 21/02

[52] U.S. Cl. ..................... 74/745; 74/331; 74/665 GA; 192/48.91; 192/87.17

[58] Field of Search .......... 74/745, 331, 333, 665 GA; 192/48.91, 87.17

[56] References Cited

U.S. PATENT DOCUMENTS

| | | | |
|---|---|---|---|
| 2,975,656 | 3/1961 | Haverlender | 174/745 |
| 3,691,869 | 9/1972 | Klaue | 192/87.17 X |
| 3,741,035 | 6/1973 | May | 74/745 |
| 3,783,985 | 1/1974 | May | 74/745 X |
| 4,023,418 | 5/1977 | Zenker | 74/745 X |
| 4,081,065 | 3/1978 | Smyth et al. | 192/0.076 |
| 4,291,794 | 9/1981 | Bauer | 192/107 M |
| 4,361,060 | 11/1982 | Smyth | 74/866 |
| 4,481,836 | 11/1984 | Richards | 192/48.91 X |
| 4,485,692 | 12/1984 | Moore et al. | 74/745 |
| 4,648,290 | 3/1987 | Dunkley et al. | 74/866 |
| 4,686,869 | 8/1987 | Beim | 74/745 |
| 4,700,823 | 10/1987 | Winckler | 192/107 M |

FOREIGN PATENT DOCUMENTS 57-6156  1/1982  Japan ..................... 74/745

Primary Examiner—Dwight G. Diehl
Assistant Examiner—Christopher C. Campbell
Attorney, Agent, or Firm—H. D. Gordon

[57] ABSTRACT

A two-speed input section (12) for a compound transmission (10) comprising an input section connected in series between the vehicle prime mover (14) and a main mechanical change gear transmission (16) is provided. The input section (12) utilizes friction clutch device (60) having a first and a second selectable position for engaging a selected one of two selectable reduction input ratios and a third disengaged position allowing the input section to provide the torque break function normally provided by a master clutch.

9 Claims, 2 Drawing Sheets

TRANSMISSION INPUT SECTION

RELATED APPLICATION

This application is related to Ser. Nos. 168,028 and 168,029 and filed the same day as this application, titled COMPOUND TRANSMISSION STRUCTURE and TRANSMISSION STRUCTURE, respectively, and assigned to the same assignee as this application.

BACKGROUND OF THE INVENTION

1. Field of the Invention

The present invention relates to a compound change gear vehicular transmission having an input section, preferably of the splitter type, connected in series with a mechanical main transmission section, preferably of the synchronized type. In particular, the present invention relates to an input section for a compound change gear transmission utilizing selectively and modulatably engagable and disengagable friction clutches having an input non-disengagably drivingly mechanically connected to the vehicle prime mover whereby the input section friction clutches, in addition to allowing input section gear changing, provide the engagement/disengagement functions of a master clutch.

2. Description of the Prior Art

Compound mechanical transmissions of the input splitter type and compound transmissions utilizing input auxiliary sections having friction clutch devices are known in the art as may be seen by reference to U.S. Pat. Nos. 4,485,692; 2,886,982 and 3,741,035, the disclosures of which are hereby incorporated by reference.

While compound mechanical (i.e. engaging ratios by means of positive clutches) change gear transmissions having input sections of the splitter type and/or using friction clutches are know, such transmissions have required the use of a disconnect member, such as a master clutch or torque converter, between the transmission and prime mover and/or have been of a relatively high inertia resulting in more difficult and/or higher energy synchronization of the main transmission section.

SUMMARY OF THE INVENTION

In accordance with the present invention, the drawbacks of the prior art are minimized or overcome by the provision of an input section for a compound vehicular transmission comprising an input section, preferably of the splitter type, connected in series between the vehicle engine and the mechanical main transmission section. The input section utilizes a friction clutch, preferably a liquid lubricated and/or cooled friction clutch, having an input that is nondisengagably mechanically connected to the engine. The section friction clutch has at least two selectable engaged positions for selection of one of two selectable input ratios and a selectable disengaged position. By moving the auxiliary section friction clutch between its selected engaged position and the disengaged position, the torque break function of a master clutch is provided.

The auxiliary section friction clutch is positioned by either the controller of an automatic/semi-automatic transmission system or by an electrical/mechanical actuator responsive to manual transmission and clutch control devices.

Accordingly, it is an object of the present invention to provide a new and improved input section for a compound transmission utilizing selectively engaged/disengaged friction clutch means having driven members drivingly mechanically nondisengagably connected to a prime mover.

This and other objects and advantages of the present invention will become apparent from a reading of the detailed description of the preferred embodiments taken in connection with the attached drawings.

DESCRIPTION OF THE PREFERRED EMBODIMENT

Figure 1:
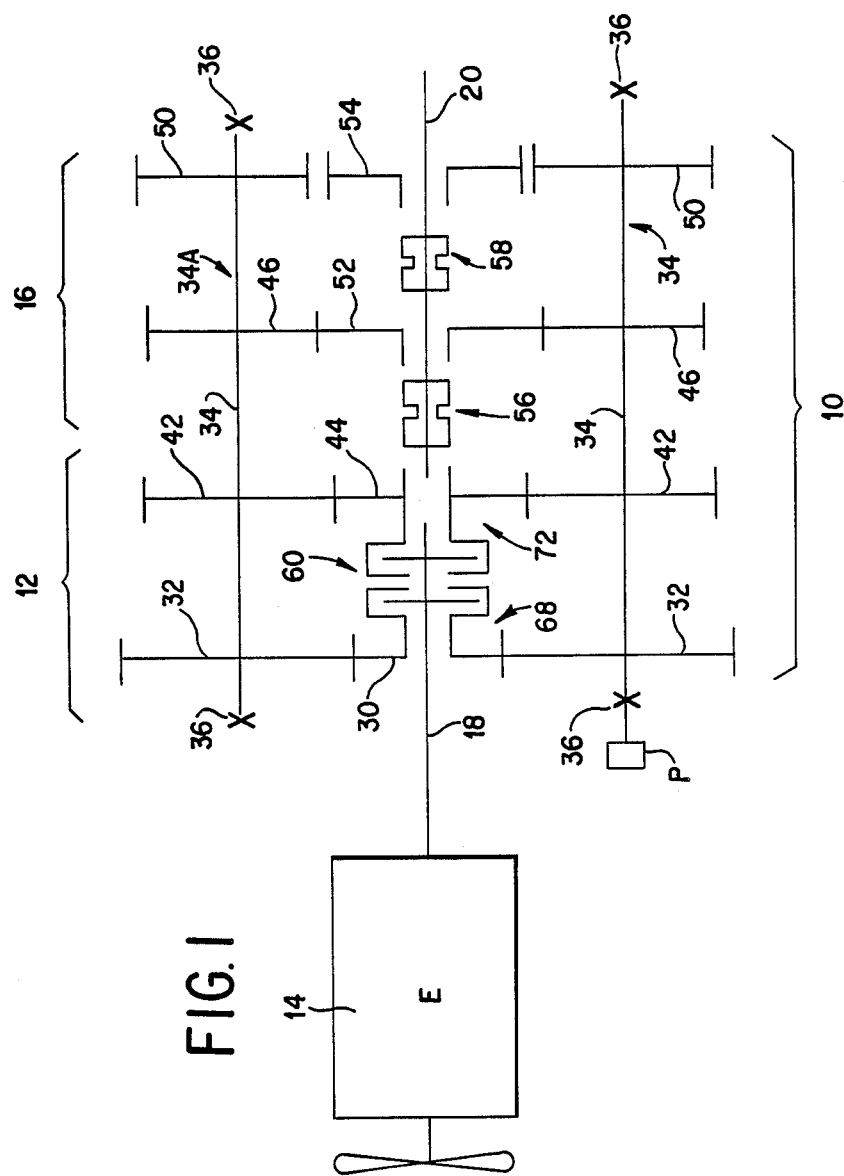
FIG. 1 is a schematic illustration of a compound mechanical transmission system utilizing the transmission input section of the present invention.

Certain terminology will be used in the following description for convenience and reference only and will not be limiting. The words "upperly", "downwardly", "rightwardly" and "leftwardly" will designate directions in the drawings to which reference is made. The words "forward" and "rearward" will refer respectively to the front and rear end of the transmission as same as conventionally mounted in the vehicle, being respectively from left to right sides of the transmission as illustrated in FIG. 1. The words "inwardly" and "outwardly" will refer to directions toward and away from, respectively, being the geometric center of the device and designated parts thereof. Said terminology will include the words above specifically mentioned, derivatives thereof and words with similar import.

The term "compound transmission" is used to designate a transmission having a main transmission section and an auxiliary transmission section connected in series whereby the selected gear reduction in the main transmission section may be compounded by further selected gear reduction in the auxiliary transmission portion. The term "input section" is used to designate a transmission section connected in series between the vehicular prime mover, such as a vehicle engine, and the main transmission section. The term "splitter type compound transmission" as used herein will designate the compound transmission wherein the auxiliary transmission is used to provide various selectable steps for subdivisions of the gear ratio selected in the main transmission section. In a splitter type compound transmission, the main transmission section is typically provided with relatively wide ratio steps which are split or subdivided by the splitter type auxiliary transmission section. Splitter type compound transmissions are well known in the prior art and examples thereof may be seen by to reference to the above-mentioned U.S. Pat. Nos. 4,485,692 and 3,741,035 and by reference to European Patent No. 0071353, the disclosure of which is hereby incorporated by reference.

A compound transmission or transmission section 10 utilizing the input section 12 of the present invention may be seen by reference to FIG. 1. Briefly, a vehicular prime mover such as engine 14 is drivingly coupled to compound change gear transmission 10 which comprises an input transmission section 12 connected in series with mechanical change gear main transmission section 16. A transmission input shaft 18 mechanically drivingly connects, in a nondisengagable manner, the vehicular engine 14 with the transmission 10 while a transmission output shaft 20 is drivingly connected to the vehicular drive wheels or is the input to a further transmission section as is well known in the prior art.

Transmission input shaft 18 is mechanically nondisengagably connected to the vehicular engine 14. A plate 22 may be fixed to shaft 18 for mounting to the engine flywheel. The transmission input shaft 18 carries by means of bearing 26 an input gear 30 rotationally movable relative thereto which is constantly meshed with substantially identical countershaft gears 32 carried by substantially identical countershafts 34. Countershafts 34 are supported by bearings 36 in housing 38. The countershafts 34 also carry a second countershaft gear 42 which is constantly meshed with gear 44. The gear 44 rotatably surrounds main or output shaft 20.

The two substantially identical countershaft assemblies 34A, each comprising a countershaft 34 supported by bearings 36 in housing 38 carry four countershaft gears 32, 42, 46 and 50 fixed for rotation therewith. Countershaft gears 32 are constantly meshed with and may support input gear 30 which surrounds input shaft 18. Countershaft gears 42 are constantly meshed with and support input/ratio gear 44 which surrounds main shaft 20 which is generally coaxial with and independently rotatable of input shaft 18 and extends from the transmission or transmission section 10. Input/ratio gear 44 surrounds the mainshaft 20 at the end thereof adjacent the input shaft 18. Countershaft gears 46 constantly mesh with and support ratio gear 52 which surrounds the mainshaft 20. Countershaft gears 50 are constantly meshed with idler gears (not shown) which are in turn constantly meshed with and support reverse gear 54.

Countershaft gears 32 and input gear 30 define a first gear layer, countershaft gears 42 and input/ratio gear 44 define a second gear layer while countershaft gears 46 and ratio 52 define a third gear layer. A fourth gear layer involved with the reverse mode of operation in transmission 10 is defined by countershaft gears 50, the idler gears, and reverse gear 54.

A double acting sliding jaw clutch 56 may be utilized to couple either input/ratio gear 44 or ratio gear 52 to main shaft 20. A single acting sliding jaw clutch 58 may be utilized to couple reverse gear 54 to main shaft 20 for reverse operation.

The structure and function of the double acting sliding jaw clutch collar 56 is well known in the prior art and examples there of may be seen by reference to U.S. Pat. Nos. 3,105,395; 3,237,472 and 3,283,613, the disclosures of all of which are hereby incorporated by reference.

The input section 12 includes a friction clutch assembly 60 having a first position for frictionally drivingly connecting transmission input shaft 18 to the input/ratio gear 44 while allowing free rotation between the input shaft 18 and input gear 30 to provide a first speed reduction between the input shaft and the countershafts. In a second position of clutch assembly 60, input shaft 18 is rotationally disengaged from gear 44 and is rotationally coupled to input gear 30 to provide a second selectable speed reduction between the input shift and the countershafts.

Preferably, as discussed above, the gear reduction obtained in the second position of clutch assembly 50 will be less than the average ratio step of the main transmission section 16, preferably equal to approximately the square root of the average main transmission section ratio step, whereby input section 12 will be a splitter type transmission section for main transmission section 16 of compound transmission 10.

The clutch assembly 60 will also have a third disengaged position wherein the input shaft 18 is independently rotatable of the main shaft 20, gear 30 and gear 44.

While transmission 10 has been described in its preferred embodiment as a transmission of the twin countershaft type having special advantages as explained in greater detail in U.S. Pat. Nos. 3,105,395 and 3,335,616, it is understood that the present invention is also equally applicable to transmissions of the single countershaft or non-identical multiple countershaft type.

Referring now specifically to the structure of clutch assembly 60, input shaft 18, carries a first set 62 and a second set 64 of clutch discs rotationally fixed thereto, input gear 30 carries a plurality of clutch discs 66 interleaved with clutch discs 62 to define a clutch disc pack 68. Input/ratio gear 44 carries a plurality of friction clutch discs 70 for rotation therewith which clutch discs are interleaved with clutch discs 64 to define a second clutch disc pack 72. A three position actuator 74 is provided for engaging disc pack 68 for coupling input shaft 18 to input gear 30, for engaging disc pack 72 for coupling input shaft 18 to input/range gear 44 or for maintaining both of the disc packs 68 and 72 in the disengaged positions thereof. Actuator 74 may be mechanical, pneumatic, or the like. Preferably, clutch assembly 60 is enclosed within a housing, is liquid cooled and utilizes friction material containing substantially pyrolytic carbon. Wet or liquid cooled friction clutches of this type are known in the prior art and may be seen in greater detail by reference to U.S. Pat. No. 4,291,794, the disclosure of which is hereby incorporated by reference.

As may be seen, either input gear 30 or input/ratio gear 44 must be coupled to input shaft 18 for torque transfer from input shaft 18 to main/output shaft 20.

Preferably, the actuator is controlled in a manner similar to that disclosed in U.S. Pat. No. 4,081,065, the disclosure of which is hereby incorporated by reference, for start from stop and gear change operations.

Figure 3:
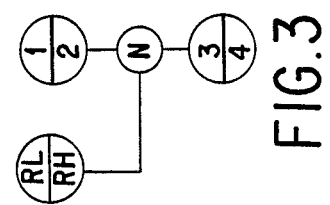
Figure 2:
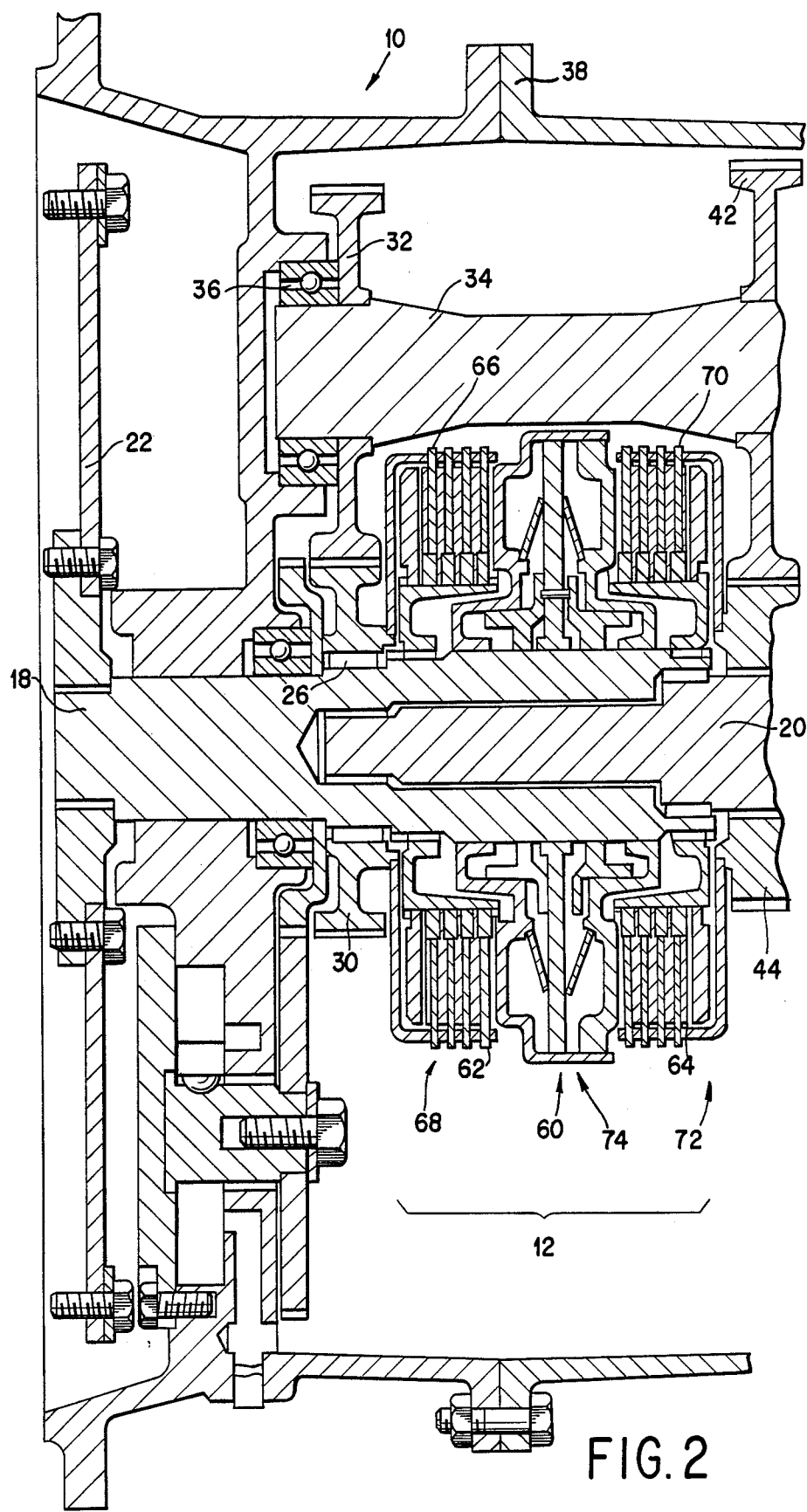
FIG. 2 is a sectional view of the auxiliary transmission input section of the present invention.

The shift pattern for transmission system 10 may be seen by reference to FIG. 3.

It is understood, of course, that the present invention is not limited to the particular embodiment illustrated and described above but also includes modifications and rearrangement of the parts within the scope of the following claims.

I claim:

1. A two-speed, splitter type, input transmission section (12) for a compound vehicular transmission (10) comprising an input section connected in series between a vehicular prime mover (14) and a change gear mechanical main transmission section (16), said input section characterized by:

an input shaft (18) non-disengageably mechanically drivingly connected to said vehicular prime mover, a first input gear (30) and a second input gear (44) coaxial with and rotatable relative to said input shaft, a countershaft assembly (34A) comprising a countershaft (34) having a first countershaft gear (32) and a second countershaft gear (42) fixed for rotation therewith, said first countershaft gear constantly meshed with said first input gear and said second countershaft gear constantly meshed with said second input gear, and a three-position friction clutch assembly (60) having a first position for coupling said first input gear to said input shaft, a second position for coupling said second input gear to said input shaft and a third position allowing independent rotation of said input shaft, said first input gear and said second input gear whereby transfer of torque from said input shaft (18) to said main transmission section (16) does not occur in said third position of said friction clutch.

2. The input transmission section of claim 1 wherein said friction is a liquid cooled clutch.

3. The input transmission section of claim 2 wherein said friction clutch utilizes friction material comprising of pyrolytic carbon.

4. The auxiliary section of claim 2 wherein said friction clutch comprises a first clutch disc pack engaged in said first position and a second clutch disc pack engaged in said second clutch position.

5. The auxiliary section of claim 1 wherein said friction clutch comprises a first clutch disc pack engaged in said first position and a second clutch disc pack engaged in said second clutch position.

6. The input transmission section of claim 1 wherein said main transmission section comprises a mainshaft (20) having a ratio gear (52) selectively coupled thereto by clutch means (56) independent of said friction clutch assembly, said ratio gear constantly meshed with a third countershaft gear (46) fixed for rotation on said countershaft.

7. The input transmission section of claim 1 further including actuating means (74) for operating said friction clutch assembly, said actuating means effective to selectively cause said assembly to assume and remain in any selected one of the three positions thereof.

8. The input transmission section of claim 1 further including actuating means (74) for said friction clutch assembly effective to cause said clutch assembly to assume said third position thereof during each ratio change of said main transmission section.

9. The input transmission section of claim 1 further including actuating means (74) for said friction clutch assembly, said actuating means effective to cause said clutch assembly to move from said third position thereof to at least one of said first and second positions thereof in a modulated manner.

* * * * *